United States Patent
Takeishi

(10) Patent No.: US 9,377,974 B2
(45) Date of Patent: Jun. 28, 2016

(54) IMAGE FORMING APPARATUS, CONTROL METHOD AND NON-TRANSITORY STORAGE MEDIUM FOR PERFORMING A PREDETERMINED PROCESS AND AN ADJUSTMENT PROCESS IN PARALLEL

(71) Applicant: CANON KABUSHIKI KAISHA, Tokyo (JP)

(72) Inventor: Hiroki Takeishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/752,995

(22) Filed: Jan. 29, 2013

(65) Prior Publication Data
US 2013/0194590 A1 Aug. 1, 2013

(30) Foreign Application Priority Data
Jan. 31, 2012 (JP) .................................. 2012-018565

(51) Int. Cl.
*G06K 15/02* (2006.01)
*G06F 3/12* (2006.01)
*G03G 15/00* (2006.01)

(52) U.S. Cl.
CPC .......... *G06F 3/1212* (2013.01); *G03G 15/5054* (2013.01); *G03G 2215/0129* (2013.01); *G03G 2215/0164* (2013.01)

(58) Field of Classification Search
None
See application file for complete search history.

(56) References Cited

U.S. PATENT DOCUMENTS

| | | | |
|---|---|---|---|
| 6,621,594 B1 * | 9/2003 | Kuwata et al. | 358/3.1 |
| 7,106,475 B1 * | 9/2006 | Tajima et al. | 358/1.9 |
| 2008/0266617 A1 * | 10/2008 | Suzuki | 358/474 |
| 2009/0317122 A1 * | 12/2009 | Takahashi | 399/82 |
| 2012/0075666 A1 * | 3/2012 | Shibuya | 358/1.15 |

FOREIGN PATENT DOCUMENTS

| | | |
|---|---|---|
| JP | 7-311506 A | 11/1995 |
| JP | 2004-125986 A | 4/2004 |
| JP | 2008-062580 A | 3/2008 |

* cited by examiner

*Primary Examiner* — Benny Q Tieu
*Assistant Examiner* — Haris Sabah
(74) *Attorney, Agent, or Firm* — Canon USA, Inc. I.P. Division

(57) ABSTRACT

An image forming apparatus that forms an image based on image data generated by executing an image process includes a first determination unit configured to determine whether a predetermined process causing a delay in the image process being executed has occurred, a second determination unit configured to determine whether a condition for an adjustment unit to perform an adjustment for maintaining the image formation has been satisfied based on condition information indicating the condition, and an instructing unit configured, in a case where the first determination unit determines that the predetermined process causing a delay in the image process being executed has occurred and the second determination unit determines that the condition has been satisfied, to instruct the adjustment unit to perform the adjustment.

12 Claims, 14 Drawing Sheets

FIG.10

| ADJUSTMENT CONTENT | ADJUSTMENT INTERVAL | ADJUSTMENT TOLERANCE |
|---|---|---|
| DENSITY ADJUSTMENT | 100 | 10 |
| REGISTRATION ADJUSTMENT | 500 | 20 |
| ⋮ | ⋮ | ⋮ |

# IMAGE FORMING APPARATUS, CONTROL METHOD AND NON-TRANSITORY STORAGE MEDIUM FOR PERFORMING A PREDETERMINED PROCESS AND AN ADJUSTMENT PROCESS IN PARALLEL

BACKGROUND OF THE INVENTION

1. Field of the Invention

Aspects of the present invention generally relate to an image forming apparatus, a control method of the image forming apparatus, and a storage medium storing a program.

2. Description of the Related Art

Image forming apparatuses such as conventional printers, multi functional peripherals (MFPs) having a lot of functions in addition to the print function, and printing presses have a problem of variation in density and tints in printing results due to the passage of time, the number of printed sheets, and the like. To solve the problem, techniques for adding a function (adjustment function) of performing an adjustment process on the image forming apparatuses to regulate the variation in tints, and the like within a certain range are used.

For example, in a case of an electrophotographic type image forming apparatus, Japanese Patent Application Laid-Open No. 2004-125986 discusses an adjustment function for adjusting a tint based on an image formed on an intermediate transfer member. Japanese Patent Application Laid-Open No. 2004-125986 further discusses another adjustment function for adjusting a starting position in image writing. Japanese Patent Application Laid-Open No. 7-311506 discusses another adjustment function for adjusting a temperature of a fixing device.

The above-described function adjustment processes, however, are performed between image formation processes in printing desired by users, and the processes may decrease the print processing speed in the printing desired by the user.

To cope with the problem, Japanese Patent Application Laid-Open No. 2008-62580 discusses a method of preventing decrease in processing speeds the users feel by performing an adjustment process simultaneously with a process other than the adjustment process. More specifically, a method of performing, for example, a rendering process of page description language (PDL) data as the process other than the adjustment process simultaneously with the adjustment process to prevent the decrease in processing speeds is discussed. One of the PDL data techniques, PostScript (registered trademark) is known.

The method of preventing the processing speed decrease by performing an adjustment process simultaneously with another adjustment process, however, cannot eliminate the adjustment process itself, and consequently, in the adjustment process, there is still an interval between the image formation.

Moreover, for example, in the above-described method of performing the adjustment process simultaneously with the rasterization process of the PDL data, the processing time necessary for the PDL data rasterization process is not considered. Consequently, if the rasterization process is completed faster than the adjustment process, the image formation is still delayed.

SUMMARY OF THE INVENTION

Aspects of the present invention relate to providing a method of further reducing delay in image formation due to adjustment.

According to an aspect of the present invention, an image forming apparatus that forms an image based on image data generated by executing an image process determines whether a predetermined process causing a delay in the image process being executed has occurred, determines, in a case where it is determined that process has occurred, whether a condition for performing an adjustment for maintaining the image formation has been satisfied based on condition information indicating the condition, and in a case where it is determined that the condition has been satisfied, instructs performance of the adjustment.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of an example of information used in the density adjustment determination process.

DESCRIPTION OF THE EMBODIMENTS

Various exemplary embodiments, features, and aspects of the invention will be described in detail below with reference to the drawings.

It should be noted that the exemplary embodiments are not to be construed as limiting the present invention. Further, all configurations described in the exemplary embodiments are not always necessary for means to solve the problems to be solved by the invention.

System Configuration

Figure 1:
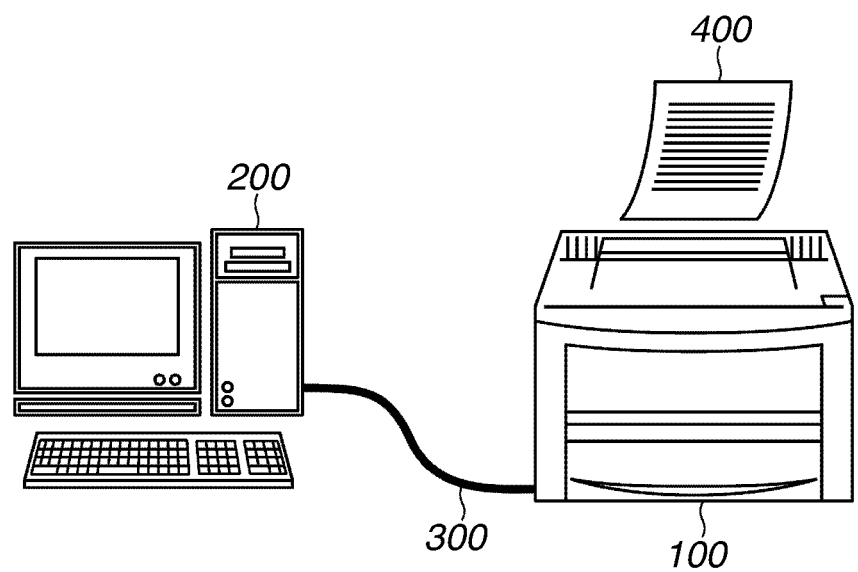
FIG. 1 illustrates an example of a system configuration.

FIG. 1 illustrates an example of a system configuration according to the exemplary embodiment. A host computer 200 is an example of information processing apparatuses (computers). The host computer 200 operates application, middleware, driver software, and the like, and generates PDL data 1000 described below, the data is an example of input data.

A printer 100 is an example of image forming apparatuses. The printer 100 forms a visible image on paper 400 using the PDL data 1000 acquired from the computer 200, or the like.

The host computer 200 and the printer 100 are communicably interconnected each other via a network 300 that is an example of communication media. The paper 400 is an example of recording media for recording visible images, furthermore, an example of visible media for expressing visible images.

In the exemplary embodiment, as the information processing apparatus, an example of the host computer 200 is described. The information processing apparatus is not limited to the host computer 200, and any device capable of generating the PDL data 1000 described below, or data equivalent to the PDL data 1000, and transferring the data can be employed. For example, in place of the host computer 200, a personal computer, a workstation, a mainframe computer, a smartphone, or a digital camera can be employed.

In the exemplary embodiment, as the image forming apparatus, an example of the printer 100 is described. The image forming apparatus is not limited to the printer 100, and in place of the printer 100, any device capable of forming a visible image, the device referred to as a MFP, a printing press, or a display device, can be employed.

PDL Data Structure

Figure 2:
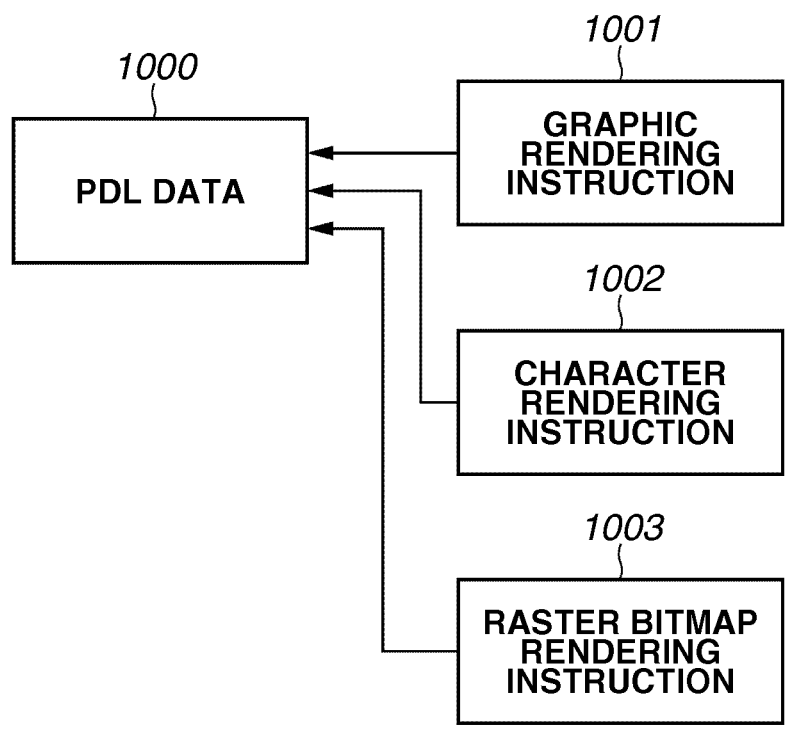
FIG. 2 illustrates an example of a PDL data structure.

With reference to FIG. 2, an example of the print data (PDL data 1000) according to the exemplary embodiment is described. FIG. 2 illustrates an example of a structure of the PDL data 1000. The PDL data 1000 includes a graphic rendering instruction 1001, a character rendering instruction 1002, and a raster bitmap rendering instruction 1003.

In the exemplary embodiment, the graphic rendering instruction 1001 is rendering instruction of graphics that can be specified by geometric information. The character rendering instruction 1002 is used for rendering a specified character. The raster bitmap rendering instruction 1003 is used for rendering a two-dimensional array having discrete color information. The PDL data 1000 may include instructions other than the above-described instructions.

Intermediate Data Structure

Figure 3:
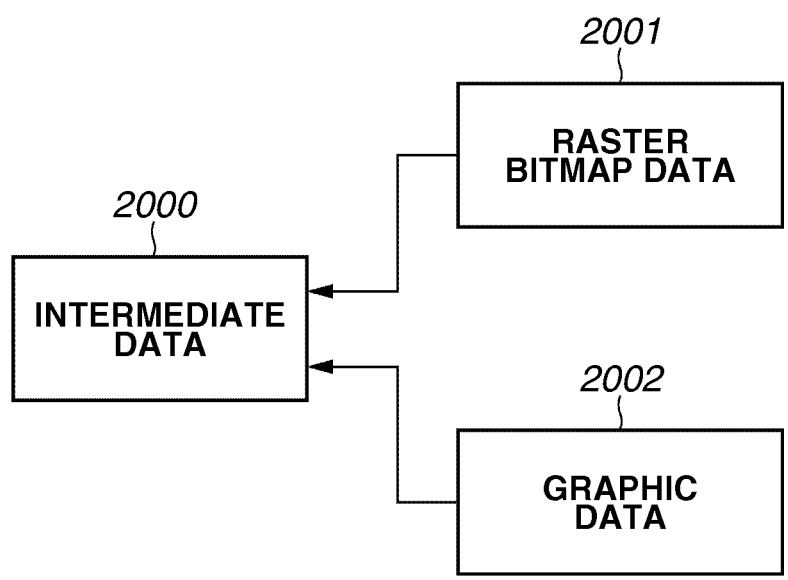
FIG. 3 illustrates an example of an intermediate data structure.

With reference to FIG. 3, an example of the intermediate data (intermediate data 2000) according to the exemplary embodiment is described. FIG. 3 illustrates a structure of the intermediate data 2000. The intermediate data 2000 is generated in a process (the process in step S20 described below) of interpreting the PDL data 1000 by the printer 100. The intermediate data 2000 includes raster bitmap data 2001, and graphic data 2002.

In the exemplary embodiment, the raster bitmap data 2001 is a rendering data used for rendering a two-dimensional array having discrete color information. The raster bitmap data 2001 is generated in a process of interpreting the graphic rendering instruction 1001, the character rendering instruction 1002, and the raster bitmap rendering instruction 1003 in the PDL data 1000.

The graphic data 2002 is a rendering data of graphics that can be specified by geometric information. The graphic data 2002 is generated in a process of interpreting the graphic rendering instruction 1001 and the character rendering instruction 1002 in the PDL data 1000. The intermediate data 2000 may include data other than the above-described data.

Printer Hardware Configuration

Figure 4:
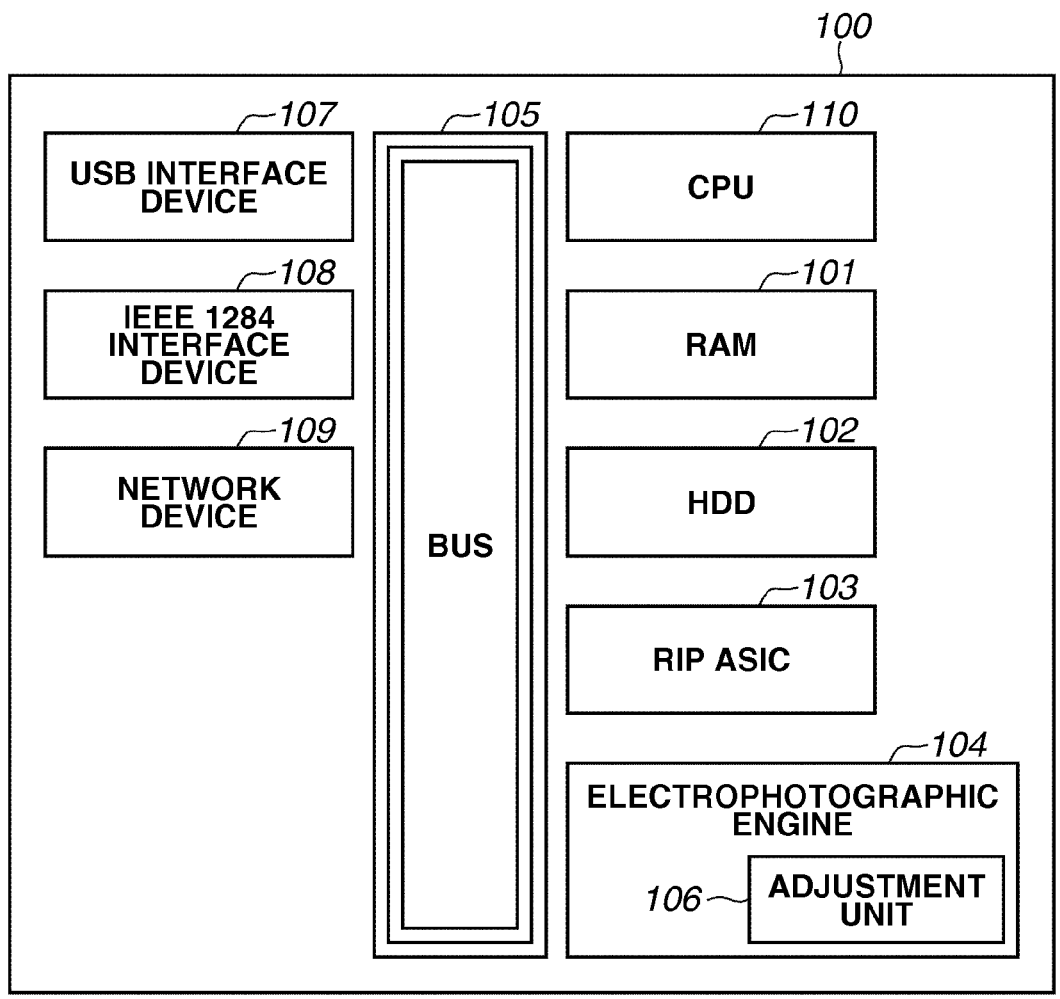
FIG. 4 illustrates an example of a printer hardware configuration.

With reference to FIG. 4, hardware for performing a process on the PDL data 1000, the hardware provided in the printer 100, is described. FIG. 4 illustrates an example of the hardware configuration of the printer 100.

A universal serial bus (USB) interface device 107 enables input of the PDL data 1000 from the outside to the printer 100 via a USB external device. An IEEE 1284 interface device 108 enables input of the PDL data 1000 from the outside to the printer 100 via an external device having hardware complying with the IEEE 1284 specifications. A network device 109 enables input of the PDL data 1000 from the outside to the printer 100 via an external device having hardware complying with a network standard.

In the exemplary embodiment, it is assumed that the IEEE 802.3 CSMA/CD standard is employed as the network standard, however, network standards other than the standard may be employed.

The USB interface device 107, the IEEE 1284 interface device 108, and the network device 109 can receive the PDL data 1000 into the printer 100 under the control with a communication control unit 301 described below.

A central processing unit (CPU) 110 executes a program (instruction) stored in a random access memory (RAM) 101 and thereby implements functions of software modules and processes according to flowcharts described below.

The RAM 101 can store the PDL data 1000, and instructions to be executed by the CPU 110, and the like. Further, the RAM 101 can transfer the PDL data 1000 and the instructions to be executed by the CPU 110 to each device including the CPU 110 via a bus 105. The RAM 101 is a volatile storage medium, and if the printer 100 is turned off, the instructions and data stored in the RAM 101 are erased.

A hard disk drive (HDD) 102 is a nonvolatile storage medium. The HDD 102 can store instructions and data to be processed by the CPU 110, and thereby the instructions and the data to be processed by the CPU 110 that are to be erased due to the power-off operation can be saved. In the exemplary embodiment, the HDD 102 has a capacity (storage capacity) larger than that of the RAM 101. Accordingly, in the exemplary embodiment, image formation data such as image formation bitmap data 3000 described below is stored in the HDD 102.

In the exemplary embodiment, the HDD 102 is described as an example of the nonvolatile storage medium, however, the storage medium is not limited to the HDD 102. In place of the HDD 102, a flash-type electrically erasable and programmable read only memory (EEPROM), a ferroelectric random access memory (FeRAM), a magnetoresistive random-access memory (MRAM), a phase-change memory (PRAM), a magnetic core memory, or the like can be employed. The RAM 101 and the HDD 102 are examples of the storage unit for storing various types of information.

A raster image processing (RIP) application-specific integrated circuit (ASIC) 103 can receive the intermediate data 2000 and generate image data (for example, the image formation bitmap data 3000 described below). An electrophotographic engine 104 forms a visible image using the image data generated with the RIP ASIC 103 on a recording medium such as paper 400.

In the exemplary embodiment, the visible image is formed on the recording medium using the electrophotographic engine 104, however, the other configurations may be employed. For example, the visible image may be acquired using a liquid crystal panel, an organic electroluminescence (EL) panel, a letterpress print engine, an offset print engine, or an inkjet print engine.

The bus 105 interconnects the above-described devices, and enables exchange of data and instructions.

Printer Software Configuration

Figure 5:
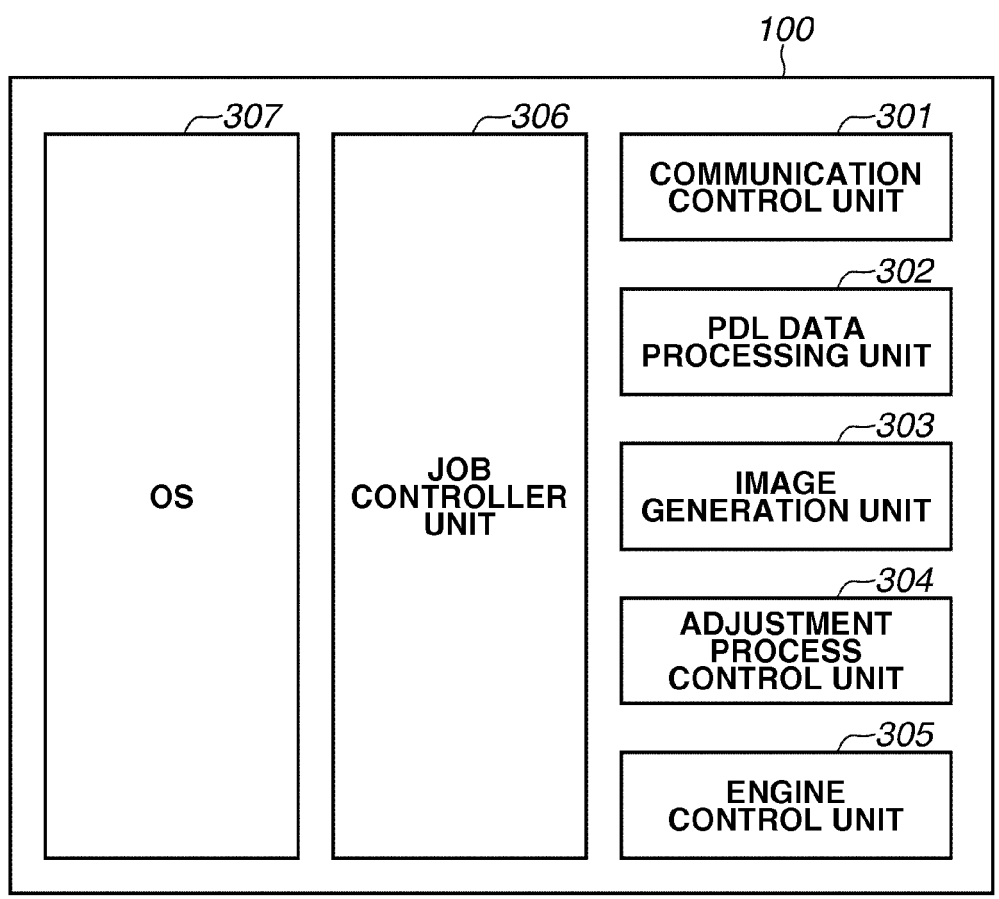
FIG. 5 illustrates an example of a printer software module configuration.

With reference to FIG. 5, an example of software (software module) operated by the CPU 110 is described. FIG. 5 illustrates an example of the software module configuration of the printer 100.

The communication control unit 301 controls the USB interface device 107, the IEEE 1284 interface device 108, and the network device 109, and establishes a communication connection with the host computer 200, and the like. The communication control unit 301 controls the USB interface device 107, the IEEE 1284 interface device 108, and the network device 109 to receive the PDL data 1000 from the host computer 200, and the like. The communication control unit 301 stores the received PDL data 1000 in the RAM 101.

A PDL data processing unit 302 performs an interpretation process on the PDL data 1000 stored in the RAM 101 to generate the intermediate data 2000. An image generation unit 303 generates the image formation bitmap data 3000 using the intermediate data 2000 obtained as a result of the interpretation process in the PDL data processing unit 302 and the RIP ASIC 103.

An adjustment process control unit 304 performs various kinds of adjustment processes for maintaining the state of the printer 100 such as the image quality in image formation. The adjustment process control unit 304, for example, performs a process described below via an engine control unit 305 to control the adjustment of the density (density adjustment) in the electrophotographic engine 104.

For example, the adjustment process control unit 304 forms image data (bitmap data, etc.) of a test pattern used for the adjustment processes on an intermediate transfer member 28 described below via the engine control unit 305. The adjustment process control unit 304 compares a signal detected by a detection sensor 106B described below in an adjustment unit 106, the detection sensor 106B detecting a test pattern on the intermediate transfer member 28, with the test pattern image data generated in the engine control unit 305 according to the instruction from the adjustment process control unit 304. The electrophotographic engine 104 performs the density adjustment based on the comparison result by the adjustment process control unit 304. The series of processes corresponds to the density adjustment process (density correction process) that is one of the adjustment processes.

The engine control unit 305 performs an image formation process (an example of the recording processes) using the image formation bitmap data 3000 and the electrophotographic engine 104. A job controller unit 306 transmits information and process flow among the above-described software modules (301, 302, 303, 304, and 305). The job controller unit 306 controls the processes (the image formation process, or the like) in the printer 100 with the above-described operation.

An operating system (OS) 307 performs task management of the above-described software modules (301, 302, 303, 304, 305, and 306). Further, the OS 307 receives instructions from these software modules (301, 302, 303, 304, 305, and 306). Further, the OS 307 controls the CPU 110, the RAM 101, the HDD 102, the RIP ASIC 103, the electrophotographic engine 104, the bus 105, the USB interface device 107, the IEEE 1284 interface device 108, and the network device 109.

Configuration of Electrophotographic Engine

Figure 6:
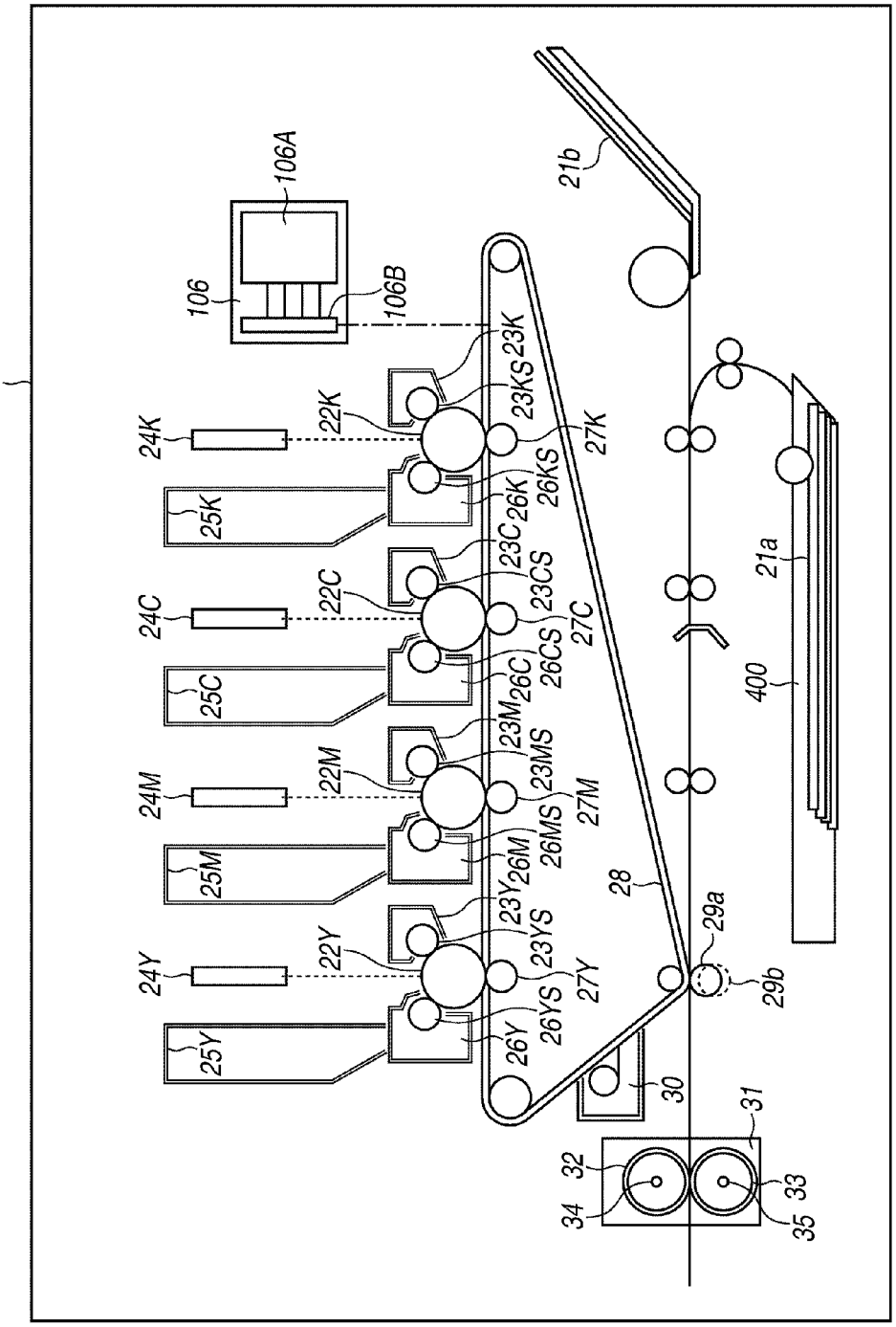
FIG. 6 illustrates an example of a configuration of an electrophotographic engine.

With reference to FIG. 6, the electrophotographic engine 104 is described. FIG. 6 illustrates an example of the configuration of the electrophotographic engine 104. The electrophotographic engine 104 is a device for forming a visible image on paper 400 based on the image formation bitmap data 3000 obtained from the engine control unit 305. The process for obtaining a visible image is described below.

First, the engine control unit 305 obtains the image formation bitmap data 3000 generated by the image generation unit 303 and the adjustment process control unit 304. The generation process of the image formation bitmap data 3000 is described below in detail.

Then, the electrophotographic engine 104 forms an electrostatic latent image and develops the electrostatic latent image to form a monocolor toner image. Further, the electrophotographic engine 104 overlays the monocolor images to form a multicolor image. Further, the electrophotographic engine 104 transfers and fixes the multicolor toner image onto the paper 400, and fixes the multicolor toner image on the paper 400. The processes are described in detail together with the devices in the electrophotographic engine 104.

The electrophotographic engine 104 includes four injection chargers 23 (23C, 23M, 23Y, and 23K) for each of the colors of cyan, magenta, yellow, and black (C, M, Y, and K) to charge photosensitive members 22 (22C, 22M, 22Y, and 22K). In the exemplary embodiment, the above-described four colors are overlaid to form a visible image, however, colors other than these colors may be employed. The photosensitive members 22 rotate by a driving force transmitted from drive motors (not illustrated) connected to the photosensitive members 22. An exposure device (not illustrated) emits exposure light of a laser beam from scanner units 24 (24C, 24M, 24Y, and 24K) to the photosensitive members 22. The exposures surface of the photosensitive members 22 is selectively exposed to form electrostatic latent images.

Development units 26 (26C, 26M, 26Y, and 26K) perform development for each color of C, M, Y, and K to visualize the electrostatic latent images. Each of the development devices 26 includes respective sleeves 26S (26CS, 26MS, 26YS, and 26KS).

An intermediate transfer member 28 rotates in the clockwise direction to receive the monocolor toner images from the photosensitive members 22. The photosensitive members 22 and primary transfer rollers 27 (27C, 27M, 27Y, and 27K) located opposite to the photosensitive members 22 rotate, and the monocolor toner images are transferred. While an appropriate bias voltage is applied to the primary transfer rollers 27, different rotation speeds are applied to the photosensitive members 22 and the intermediate transfer member 28 to efficiently transfer the monocolor toner images onto the intermediate transfer member 28. The series of processes is referred to as a primary transfer.

Further, the monocolor toner images of the individual stations are overlaid onto the intermediate transfer member 28. The overlaid multicolor toner image is conveyed to a secondary transfer roller 29 with the rotation of the intermediate transfer member 28. Simultaneously, the paper 400 is conveyed from paper feed trays 21 (21a and 21b) to the secondary transfer roller 29, and the multicolor toner image on the intermediate transfer member 28 is transferred onto the paper 400. In this process, an appropriate bias voltage is applied to the secondary transfer roller 29 to electrostatically transfer the toner image. This process is called a secondary transfer.

The secondary transfer roller 29 abuts on the paper 400 at a position 29a while the multicolor toner image is being transferred onto the paper 400, and separates from the paper 400 at a position 29b after the print processing.

The detection sensor 106B in the adjustment unit 106 detects the density of the multicolor toner image overlaid on the intermediate transfer member 28. A microcomputer 106A in the adjustment unit 106 notifies the adjustment process control unit 304 of the detected density via the engine control unit 305. Through the processes, the adjustment process control unit 304 can obtain the difference between the density in the image data and the density of the toner image formed based on the image data on the intermediate transfer member 28.

A fixing device 31 is an example of the fixing unit. The fixing device 31 melts the multicolor toner image transferred onto the paper 400 and fixes the image onto the paper 400. A fixing roller 32 and a pressure roller 33 are formed to be hollow, and include heaters 34 and 35 in the rollers respectively. The fixing roller 32 and the pressure roller 33 use the heat and pressure of the heaters to fix the toner onto the paper 400.

The paper 400 on which the toner is fixed is discharged by a discharge roller (not illustrated) onto a discharge tray (not illustrated), and then, the printer 100 ends the image formation operation (image formation process).

A cleaning device 30 cleans the toner remaining on the intermediate transfer member 28. In other words, the toner remained after the transfer of the four-color multicolor toner image formed on the intermediate transfer member 28 is stored in a collection toner container.

Data Flow

Figure 7:
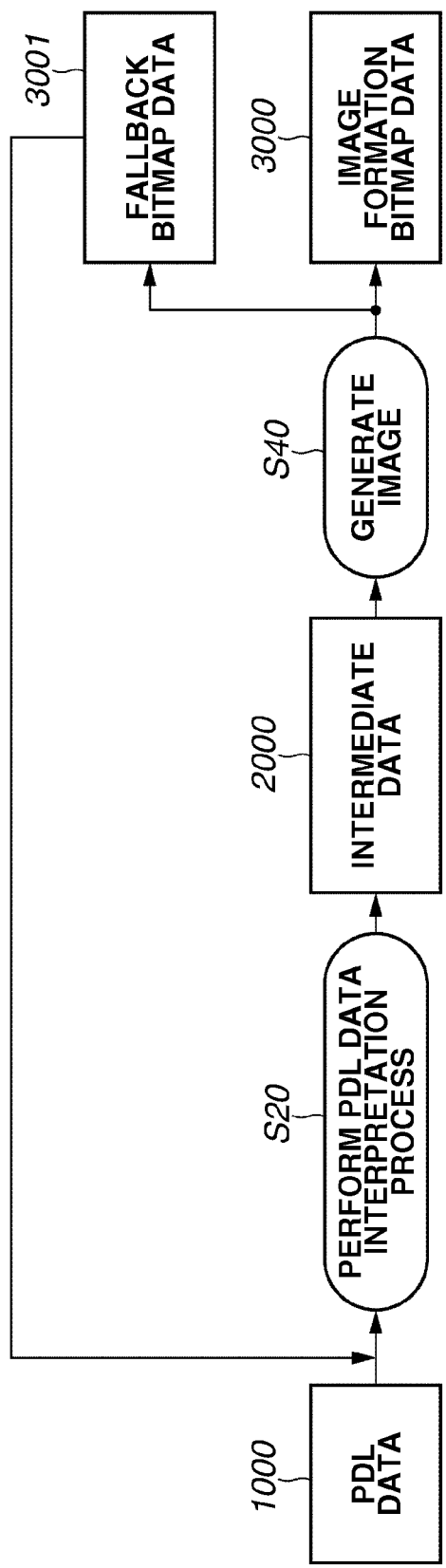
FIG. 7 illustrates an example of an image process.

With reference to FIG. 7, processes performed on the PDL data 1000 by the individual devices and the software module group in the printer 100 are described. FIG. 7 illustrates an example of the processes (image processing) relating to the data to be processed by the printer 100.

In the exemplary embodiment, the printer 100 receives the PDL data 1000 as input data via the USB interface device 107, the IEEE 1284 interface device 108, or the network device 109. The received PLD data 1000 is stored in the RAM 101 (or the HDD 102, or the like) by the job controller unit 306.

In step S20, a PDL data processing unit 302 performs an interpretation process on the PDL data 1000 under the control of the job controller unit 306, and generates the intermediate data 2000. The PDL data processing unit 302 stores the generated intermediate data 2000 in the RAM 101.

In the process, if the volume of the intermediate data 2000 is less than the limitation in the capacity of the RAM 101, as described below, a process for generating the image formation bitmap data 3000 is performed with an image generation unit 303. If the volume of the intermediate data 2000 exceeds the limitation in the capacity of the RAM 101, a fallback process described below is performed. First, a case where the fallback process is not performed is described.

In step S40, the image generation unit 303 generates on the RIP ASIC 103 the image formation bitmap data 3000 using the intermediate data 2000 as an input. The RIP ASIC 103 stores the generated image formation bitmap data 3000 in the RAM 101.

The engine control unit 305 forms with the electrophotographic engine 104 a visible image on the paper 400 under the control of the job controller unit 306 based on the image formation bitmap data 3000.

Fallback Process

Next, a case where the fallback process is performed is described. The data capacity for storing the intermediate data 2000 in the RAM 101 is limited. Consequently, the volume of the intermediate data 2000 to be generated in the interpretation process of the PDL data 1000 is also limited. If the printer 100 determines that situation where the volume of the intermediate data 2000 to be stored in the RAM 101 exceeds the limit has occurred, the printer 100 performs the fallback process.

In the fallback process, first, if the volume of the intermediate data 2000 reaches the limit in the capacity of the RAM 101 in the interpretation process (in execution of the image processing) of the PDL data 1000, the PDL data processing unit 302 temporarily suspends the interpretation process for generating the intermediate data 2000.

In step S40, the image generation unit 303 generates on the RIP ASIC 103 fallback bitmap data 3001 using the suspended intermediate data 2000 as an input. The RIP ASIC 103 stores the generated fallback bitmap data 3001 in the RAM 101.

The PDL data processing unit 302 generates empty intermediate data 2000 in the RAM 101. The PDL data processing unit 302 stores the fallback bitmap data 3001 in the RAM 101 as raster bitmap data 2001 in the intermediate data 2000.

The PDL data processing unit 302 resumes the interpretation process. In this process, the PDL data processing unit 302 performs the interpretation process of the PDL data 1000 using the intermediate data 2000 containing the raster bitmap data 2001 as the background of the rendering, and generates the intermediate data 2000. In other words, the intermediate data 2000 of increased volume is put together as one piece of raster bitmap data 2001 by the fallback process, and the volume is reduced. Through the process, the intermediate data 2000 generation process suspended due to the limitation in the capacity of the RAM 101 can be performed.

In step S20, the PDL data processing unit 302 resumes the suspended interpretation process of the PDL data 1000. The PDL data processing unit 302 adds the raster bitmap data 2001 in the intermediate data 2000 and graphic data 2002 with the raster bitmap data 2001 as a background.

As described above, the fallback process can prevent the problem that the generation of the intermediate data 2000 becomes impossible due to the limitation in the capacity of the RAM 101. In the fallback process, however, it is required to suspend the interpretation process of the PDL data 1000, and perform the image generation process in step S40. Consequently, the generation of the image formation bitmap data 3000 with the fallback process takes more time than the generation of the image formation bitmap data 3000 without the fallback process.

Image Formation Process

Figure 8:
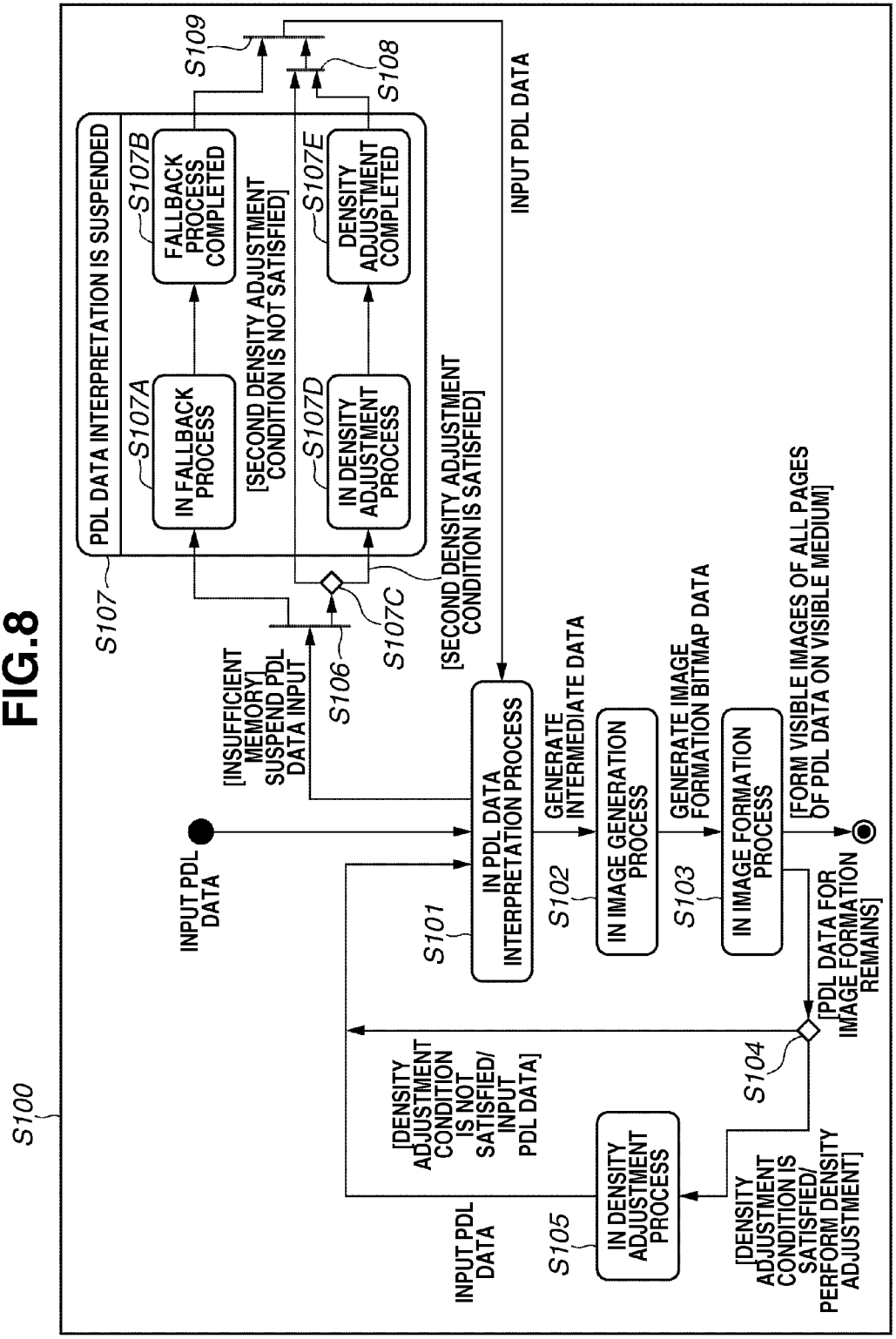
FIG. 8 illustrates an example of a flowchart in an image formation process.

With reference to FIG. 8, the image formation process is described. FIG. 8 illustrates an example of a flowchart of the image formation process.

In step S101, in response to the start of input of the PDL data 1000, the PDL data processing unit 302 starts the interpretation process of the PDL data. In the interpretation process, the PDL data processing unit 302 generates the intermediate data 2000. In step S102, when the generation of one page of the intermediate data 2000 is completed, the image generation unit 303 interprets the generated intermediate data 2000 to generate the image formation bitmap data 3000.

In step S103, the engine control unit 305 controls the electrophotographic engine 104 to form a visible image on the paper 400 based on the image formation bitmap data 3000.

The job controller unit 306 makes an inquiry to the PDL data processing unit 302 about whether the PDL data 1000 to form a visible image exists. In this process, if the job controller unit 306 determines that visible images of all pages in the PDL data 1000 are formed on the paper 400, the job controller unit 306 ends the image formation process. If the job controller unit 306 determines that the PDL data 1000 to form a visible image onto the paper 400 remains, the process proceeds to step S104.

Figure 9:
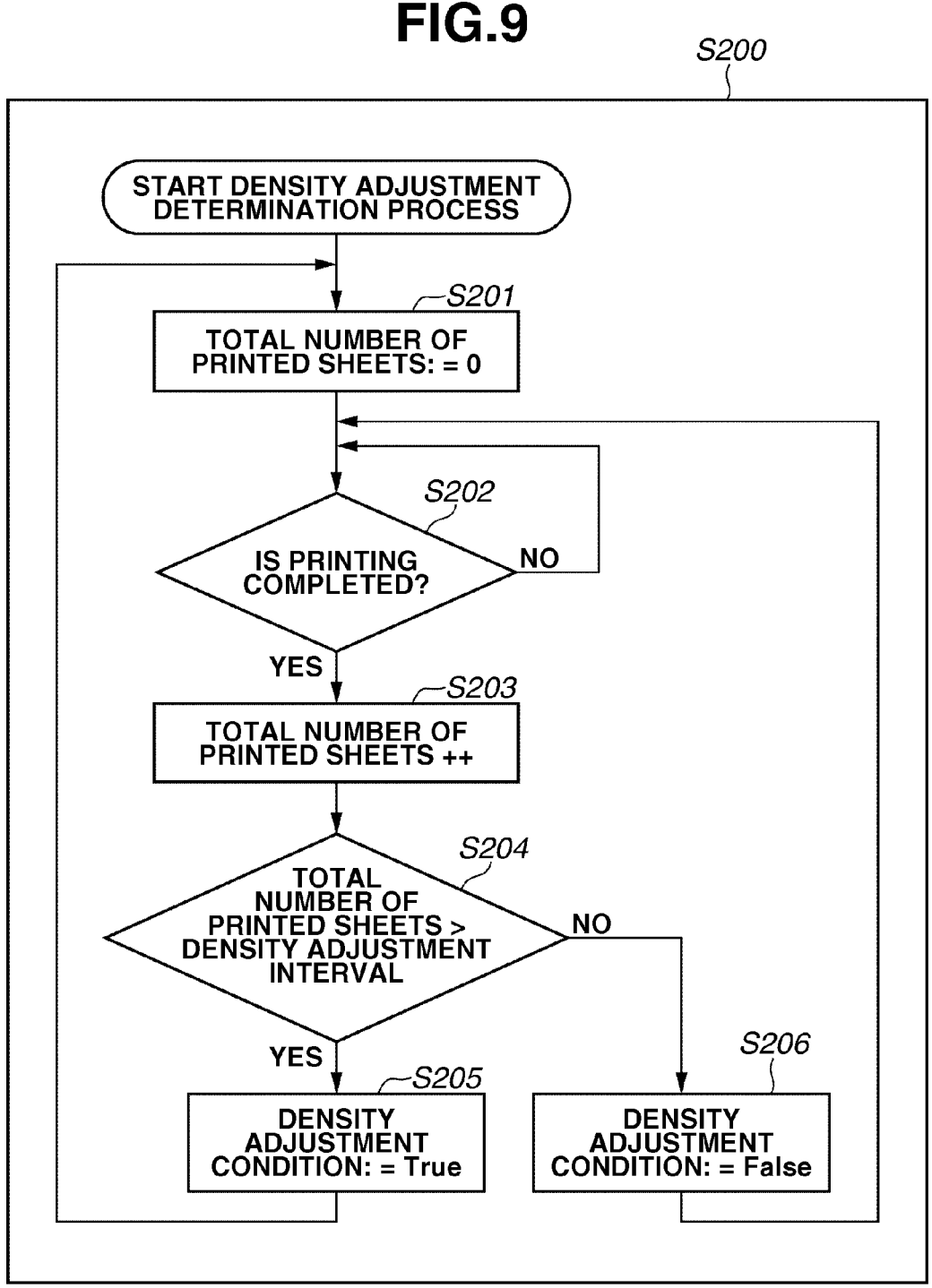
FIG. 9 illustrates an example of a flowchart in a density adjustment determination process.

In step S104, the adjustment process control unit 304 determines whether a density adjustment condition has been satisfied. The determination whether the density adjustment condition has been satisfied is performed based on the number of printed sheets (the total number of printed sheets) counted from the previous density adjustment process (density adjustment determination process). With reference to FIG. 9, the density adjustment determination process is described. FIG. 9 illustrates an example of a flowchart of the density adjustment determination process.

In step S201, in starting the printer 100, the adjustment process control unit 304 initializes the variable of the total number of printed sheets. The initialized variable is stored in the RAM 101. In step S202, the adjustment process control unit 304 waits for a notification of print completion, that is, a notification of print completion of one page from the engine control unit 305 via the job controller unit 306. If the adjustment process control unit 304 has detected a print completion, the process proceeds to step S203.

In step S203, the adjustment process control unit 304 substitutes a value obtained by adding "1" to the variable into the variable of the total number of printed sheets (increment process). The total number of printed sheets to which "1" is added is stored in the RAM 101.

In step S204, the adjustment process control unit 304 compares the variable of an interval (density adjustment interval) for performing the density adjustment process, the variable is stored in the HDD 102 in advance, with the variable of the total number of printed sheets. The numerical value of the density adjustment interval is stored in the HDD 102 in the form of the table illustrated in FIG. 10. FIG. 10 illustrates an example of information (condition information) used in the density adjustment determination process.

More specifically, the adjustment process control unit 304 extracts a record of "density adjustment" out of the items of the adjustment contents in the table. The adjustment process control unit 304 extracts a numerical value of the adjustment interval from the extracted record of "density adjustment". With respect to the numerical value of the adjustment interval, depending on the adjustment process (adjustment content), the number of sheets, time, or the like is set. The adjustment process control unit 304 stores the extracted numerical value of the adjustment interval as the variable in the density adjustment interval in the RAM 101 to perform a comparison with the total number of printed sheets.

As a result of the comparison, if the adjustment process control unit 304 determines that the total number of printed sheets is larger, the process proceeds to step S205. As a result of the comparison, if the adjustment process control unit 304 determines that the total number of printed sheets is not larger, the process proceeds to step S206.

In step S205, the adjustment process control unit 304 substitutes a true value (True) into a determination flag of the density adjustment condition. The determination flag is stored in the RAM 101. After the process, the process proceeds to step S201, and the adjustment process control unit 304 initializes the total number of printed sheets again.

In step S206, the adjustment process control unit 304 substitutes a false value (False) into the determination flag of the density adjustment condition. The determination flag is stored in the RAM 101. After the process, the process proceeds to step S202, and the adjustment process control unit 304 is in a standby state until detecting a print completion notification.

As a result of the above-described process, if the determination flag for the density adjustment condition is a false value, in step S101, the PDL data processing unit 302 resumes the input of the PDL data 1000 and executes the interpretation process of the PDL data 1000 of the next page.

As a result of the above-described process, if the determination flag for the density adjustment condition is a true value, in step S105, the adjustment process control unit 304 performs the density adjustment process. In response to the completion of the density adjustment process, in step S101, the PDL data processing unit 302 proceeds the input of the PDL data 1000 to execute the interpretation process of the PDL data 1000 of the next page.

In the interpretation process of the PDL data 1000 in step S101, if the capacity of the RAM 101 for storing the intermediate data 2000 becomes insufficient, the PDL data processing unit 302 stops the input of the PDL data 1000. Further, the PDL data processing unit 302 notifies the job controller unit 306 that the intermediate data 2000 has not been stored. Through the processes, in step S106, the interpretation process of the PDL data 1000 is suspended. In step S107A, in response to the reception of the notification, the job controller unit 306 notifies the PDL data processing unit 302 and the image generation unit 303 that the fallback process is to be started.

Simultaneously with (in parallel with) the process, in step S107C, the adjustment process control unit 304 determines whether a second density adjustment condition described below has been satisfied. If the adjustment process control unit 304 determines that the second density adjustment condition has been satisfied, in step S107D, the adjustment process control unit 304 performs the density adjustment process. In step S107E, the adjustment process control unit 304 waits for the completion of the density adjustment with the electrophotographic engine 104, and in response to the completion, the process proceeds to step S108. In response to the reception of the completion of the density adjustment via the engine control unit 305, the adjustment process control unit 304 initializes the total number of printed sheets, in other words, the unit 304 sets the total number of printed sheets to zero. In step S107C, if the adjustment process control unit 304 determines that the second density adjustment condition has not been satisfied, the adjustment process control unit 304 does not perform the density adjustment process, and the process proceeds to step S108.

In step S108, the adjustment process control unit 304 notifies the job controller unit 306 of the completion of the density adjustment process. In step S109, the job controller unit 306 waits for the notification from the adjustment process control unit 304 and the completion of the fallback process.

In response to the detection of these notifications, the job controller unit 306 instructs the PDL data processing unit 302 to resume the input of the PDL data 1000. In step S101, in response to the reception of the instruction from the job controller unit 306, the PDL data processing unit 302 resumes the interpretation process of the PDL data 1000.

Density Adjustment Determination Process in Fallback Process

Figure 11:
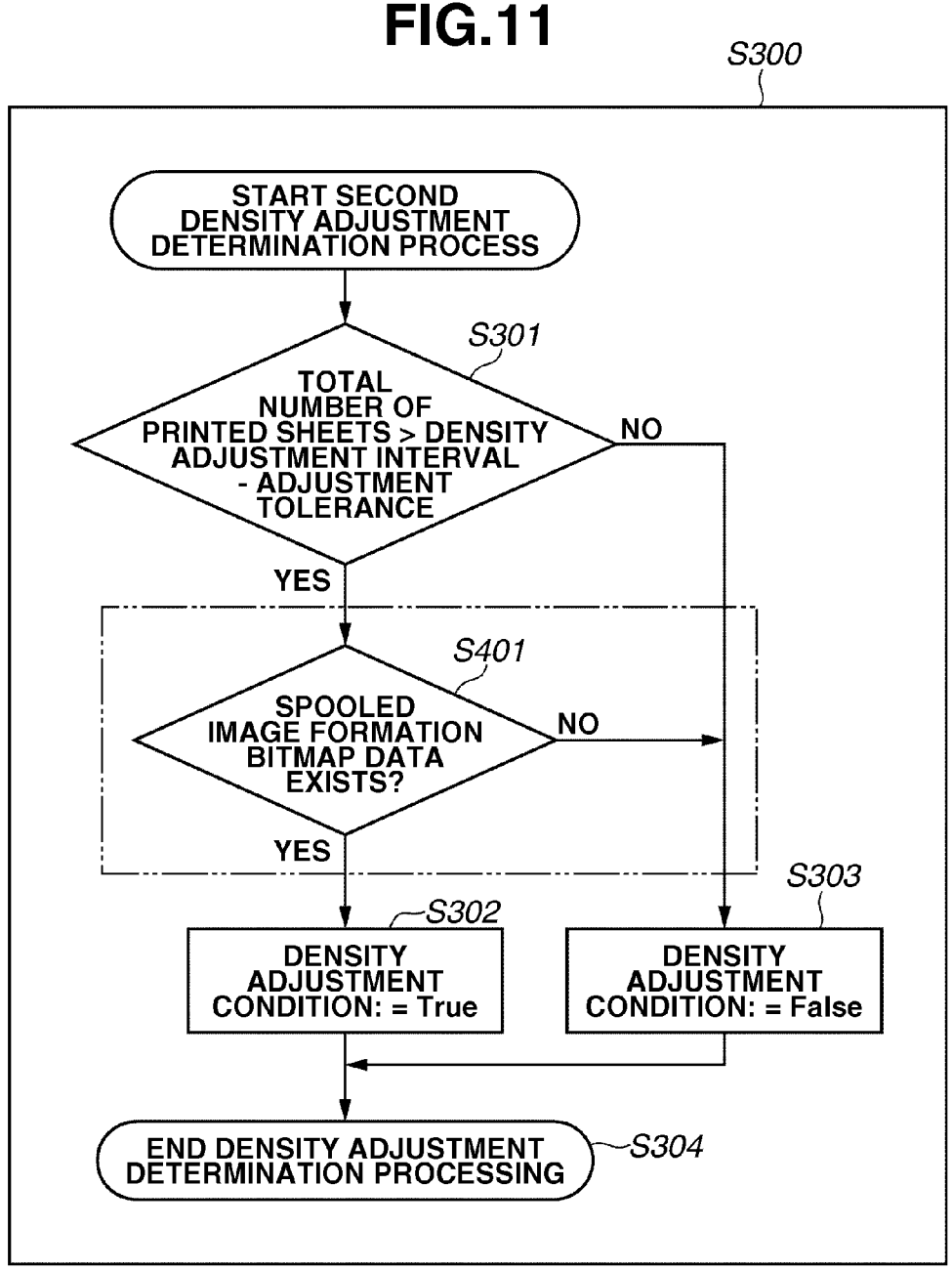
FIG. 11 illustrates an example of a flowchart in a second density adjustment determination process.

With reference to FIGS. 10 and 11, the second density adjustment determination process (S107C) using the second density adjustment condition is described. FIG. 11 illustrates a flowchart according to the second density adjustment determination process. The process in step S401 is a process employed in the second exemplary embodiment, and in the present exemplary embodiment, the description of the process is omitted.

In step S301, the adjustment process control unit 304 compares the total number of printed sheets with a value obtained by subtracting an adjustment tolerance from the density adjustment interval. With respect to the numerical value of the adjustment tolerance, depending on the adjustment process (adjustment content), the number of sheets, time, or the like is set. With respect to the total number of printed sheets, the variable described above is similarly employed. With respect to the density adjustment interval, the variable described above is similarly employed. In other words, the same variables as the variables already stored in the RAM 101 by the adjustment process control unit 304 are employed, and the ranges defined by the individual variables are the same ranges defined by the individual already stored variables.

The numerical value of the adjustment tolerance can be acquired according to the following method. The numerical value of the adjustment tolerance is stored in the HDD 102 in the form of the table illustrated in FIG. 10. Specifically, as the numerical value of the adjustment tolerance used in the second density adjustment process, the adjustment process control unit 304 extracts the record of "density adjustment" out of the items of the adjustment contents in the table. The adjustment process control unit 304 extracts a numerical value of the adjustment tolerance from the extracted record of "density adjustment". The adjustment process control unit 304 stores the extracted numerical value of the adjustment tolerance as the variable of the adjustment tolerance in the RAM 101.

In step S301, if the adjustment process control unit 304 determines that the total number of printed sheets is larger (YES in step S301), the process proceeds to step S302. If the adjustment process control unit 304 determines that the total number of printed sheets is not larger (NO in step S301), the process proceeds to step S303. The adjustment interval (for example, "100") and the adjustment tolerance (for example, "10") are information (for example, "90", and the information is an example of the information of the number of sheets capable of specifying the number of sheets to be recorded) capable of specifying the number of printed sheets for allowing (permitting) the density adjustment.

After the comparison, in step S302, the adjustment process control unit 304 substitutes a true value into the determination flag of the second density adjustment condition. The determination flag is stored in the RAM 101. In step S303, the adjustment process control unit 304 substitutes a false value into the determination flag of the second density adjustment condition. The determination flag is stored in the RAM 101.

After the substitution process of the true value or the false value into the determination flag, in step S304, the adjustment process control unit 304 ends the second density adjustment determination process.

Advantages of Present Exemplary Embodiment

In the exemplary embodiment, in the process (escape process) for escaping the limitation in processing the PDL data 1000, for example, in the process (for example, in the fallback process) for escaping the limitation in the capacity of the RAM 101, the printer 100 performs the above-described processes.

In other words, a condition (for example, the second density adjustment condition) other than the original condition for determining whether the adjustment process is to be performed is newly provided, and if the newly provided condition has been satisfied, in the escape process (for example, step S107A), the adjustment process (for example, step S107D) is performed in advance.

As described above, the simultaneous escape process and adjustment process under the specific conditions can reduce the speed decrease in the image formation due to the adjustment process. The specific conditions in the exemplary embodiment is the state the escape process is being performed and close to the timing the original adjustment process is performed.

A second exemplary embodiment will be described. In recent years, the capacity of the HDD 102 have been increasing. The increase in volume of the HDD 102 has enabled spooling (storing and saving) of huge volumes of data represented by the image formation bitmap data 3000. In the exemplary embodiment, in a configuration of spooling the image formation bitmap data 3000 of many sheets in the HDD 102, a method of reducing the decrease in image formation speed due to the adjustment process is described.

More specifically, in the exemplary embodiment, even if the generation of the image formation bitmap data 3000 is delayed due to the escape process, the engine control unit 305 continues the image formation. In other words, the engine control unit 305 uses the image formation bitmap data 3000 stored in the HDD 102 to continue the image formation, and the adjustment process control unit 304 performs the adjustment process as described below. In the exemplary embodiment, descriptions of configurations similar to those in the first exemplary embodiment are omitted, and configurations different from those in the first exemplary embodiment are mainly described.

Printer Software Configuration

Figure 12:
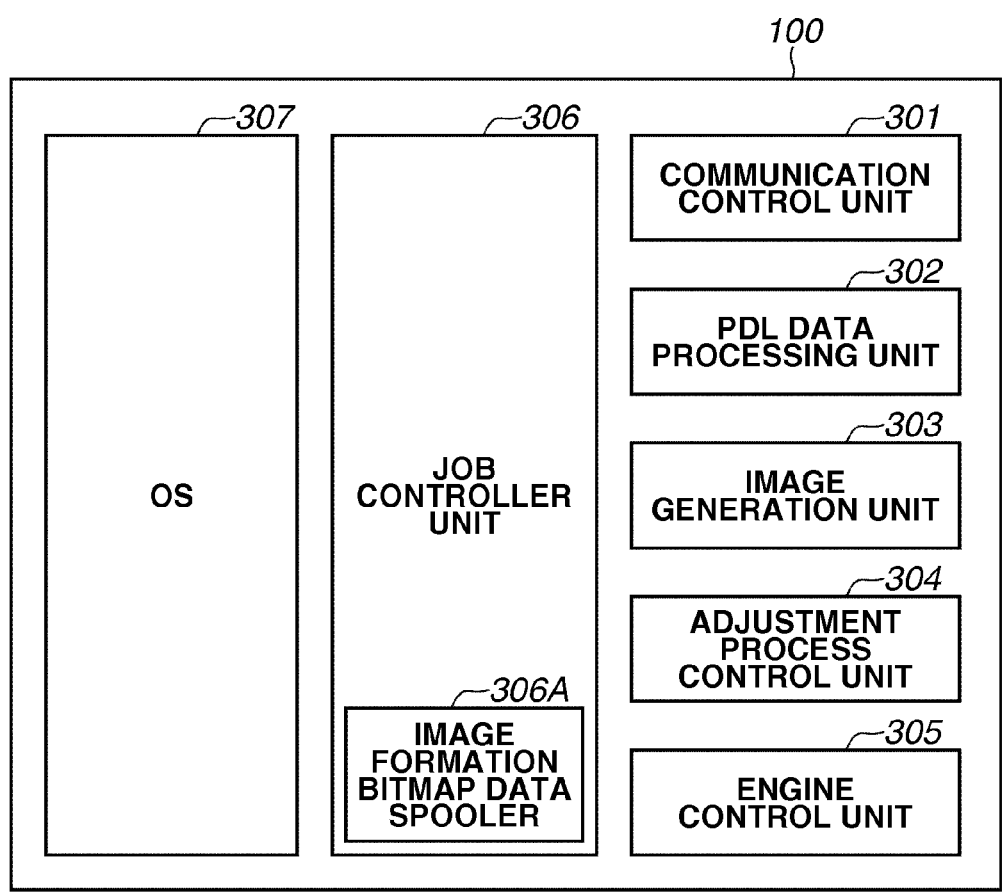
FIG. 12 illustrates an example of a printer software module configuration.

With reference to FIG. 12, software modules that operate in the printer 100 are described. FIG. 12 illustrates an example of the software module configuration of the printer 100. The software modules not described in the description are similar to those in the first exemplary embodiment, and consequently, the descriptions are omitted.

The job controller unit 306 performs information transmission and process flow transmission among the software modules. Through the operation, the job controller unit 306 implements the image formation process, or the like in the printer 100.

The job controller unit 306 includes an image formation bitmap data spooler (spooler 306A). The spooler 306A spools the image formation bitmap data 3000 under the control of the job controller unit 306. In other words, if the image generation (step S40 in FIG. 13) by the image generation unit 303 is faster than the image formation by the electrophotographic engine 104, the spooler 306A stores in the HDD 102 one or more sheets of the image formation bitmap data 3000 that has not image-formation processed.

In the exemplary embodiment, the spooler 306A stores the image formation bitmap data 3000 in the HDD 102, however, the storage destination is not limited to the HDD 102. For example, the data may be stored in the RAM 101 or the other storage devices.

Data Flow

Figure 13:
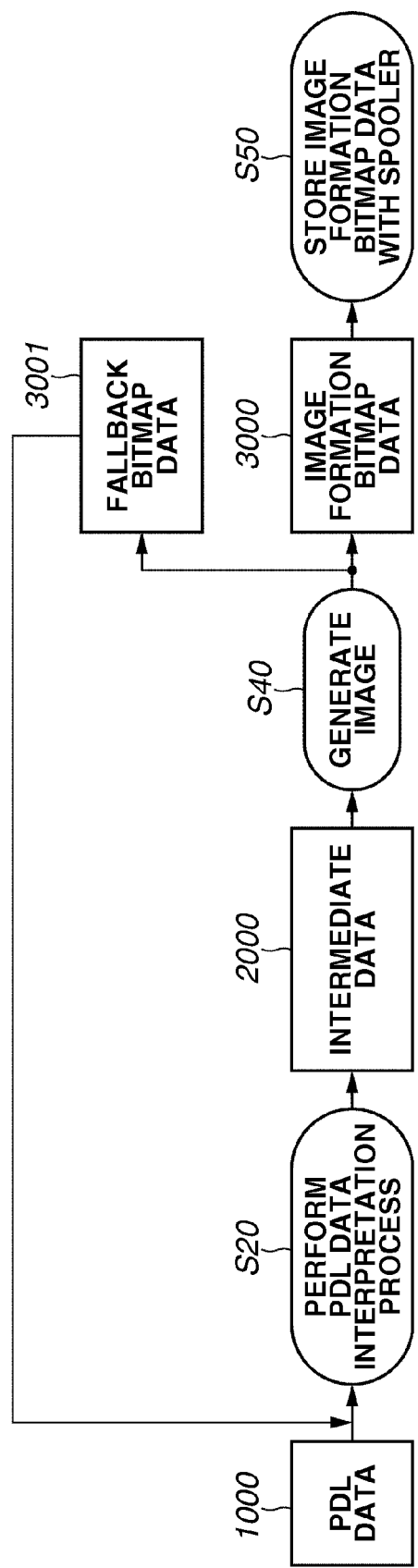
FIG. 13 illustrates an example of an image process.

With reference to FIG. 13, processes performed on the PDL data 1000 by the individual devices and the software module group are described. FIG. 13 illustrates an example of the processes (image processing) relating to the data to be processed by the printer 100. The configurations not described in the description below are similar to those in the first exemplary embodiment, and consequently, the descriptions are omitted.

In step S40, the image generation unit 303 generates on the RIP ASIC 103 the image formation bitmap data 3000 using the intermediate data 2000 as an input. The RIP ASIC 103 stores the generated image formation bitmap data 3000 in the RAM 101. The image generation unit 303 notifies the job controller unit 306 of the completion of the process of storing the image formation bitmap data 3000.

In step S50, the job controller unit 306 controls the spooler 306A to temporarily store in the HDD 102 the image formation bitmap data 3000 stored in the RAM 101.

The job controller unit 306 controls the engine control unit 305 to perform image formation of the spooled image formation bitmap data 3000 in chronological order on the paper 400. The job controller unit 306 controls the spooler 306A to erase from the HDD 102 the image formation bitmap data 3000 whose image formation is completed.

Density Adjustment Determination Process in Fallback Process

With reference to FIG. 11, a determination method (a second density adjustment determination process) according to the exemplary embodiment corresponding to the determination method (the second density adjustment determination process) using the second density adjustment condition described in the first exemplary embodiment is described.

In step S301, the adjustment process control unit 304 compares the total number of printed sheets with a value obtained by subtracting an adjustment tolerance from the density adjustment interval. The method of obtaining the total number of printed sheets, the density adjustment interval, and the value of the adjustment tolerance is similar to that in the first exemplary embodiment, and consequently, the description is omitted.

If the adjustment process control unit 304 determines that the total number of printed sheets is larger (YES in step S301), the process proceeds to step S401. If the adjustment process control unit 304 determines that the total number of printed sheets is not larger (NO in step S301), the process proceeds to step S303.

In step S401, the adjustment process control unit 304 makes an inquiry to the job controller unit 306 about whether the spooled image formation bitmap data 3000 exists in the HDD 102. The job controller unit 306 receives the inquiry, and controls the spooler 306A to determine whether the image formation bitmap data 3000 of a predetermined number of sheets (for example, two sheets) or more exists in the HDD 102.

If the job controller unit 306 determines that the data of two or more sheets exists (YES in step S401), the job controller unit 306 notifies the adjustment process control unit 304 that the spooled image formation bitmap data 3000 exists. In response to the reception of the notification in the adjustment process control unit 304, the process proceeds to step S302.

If the job controller unit 306 determines that the data of two or more sheets does not exist (NO in step S401), the job controller unit 306 notifies the adjustment process control unit 304 that no spooled image formation bitmap data 3000 exists. In response to the reception of the notification in the adjustment process control unit 304, the process proceeds to step S303.

As a result of the determination, in step S302, the adjustment process control unit 304 substitutes a true value into the determination flag of the second density adjustment condition. The determination flag is stored in the RAM 101. As a result of the determination, in step S303, the adjustment process control unit 304 substitutes a false value into the determination flag of the second density adjustment condition. The determination flag is stored in the RAM 101.

After the substitution process of the true value or the false value into the determination flag, in step S304, the adjustment process control unit 304 ends the second density adjustment determination process according to the present exemplary embodiment.

Advantages of the Present Exemplary Embodiment

In the exemplary embodiment, the printer 100 performs the above-described processes in the escape process (for example, in the fallback process).

In other words, in addition to the determination in step S301, the printer 100 further determines whether the spooled image formation bitmap data 3000 exists in the HDD 102. More specifically, the condition (for example, the second density adjustment condition) other than the original condition for determining whether the adjustment process is to be performed is newly provided, and if the newly provided condition has been satisfied, in the escape process (for example, step S107A), the adjustment process (for example, step S107D) is performed in advance.

As described above, the simultaneous escape process and adjustment process under the specific conditions can reduce the speed decrease in the image formation due to the adjustment process. In the present exemplary embodiment, the state under the specific conditions is the sate in the escape process, close to the timing for performing the original adjustment process, and the electrophotographic engine 104 can continue the image formation.

In other words, the decrease in the image formation speed occurred due to the adjustment process can be further reduced by determining whether the image formation using the image formation bitmap data 3000 spooled in the HDD 102 can be continued.

A third exemplary embodiment will be described. In the first and second exemplary embodiments, the software modules, that is, the adjustment process control unit 304 determines the adjustment contents to be performed with the adjustment unit 106 in the adjustment processes (for example, step S107D) in processing the PDL data 1000.

Meanwhile, in recent years, processes in the printer 100 have become complicated, so that it has become difficult to perform all of the processes with a single CPU 110. To solve the problem, in the exemplary embodiment, the adjustment unit 106 provided in the electrophotographic engine 104 determines the adjustment contents in which appropriate adjustment is actually performed.

In the present exemplary embodiment, descriptions of configurations similar to those in the first exemplary embodiment are omitted, and configurations different from those in the first exemplary embodiment are mainly described. With respect to the second exemplary embodiment, similarly, the descriptions are omitted.

Structure of Electrophotographic Engine

With reference to FIG. 6, the electrophotographic engine 104 according to the present exemplary embodiment is described. The software modules, and the like not described in the description below are similar to those in the first exemplary embodiment, and consequently, the descriptions are omitted.

In step S104 (or in step S107C), if the adjustment process control unit 304 determines that the density adjustment condition (or the second density adjustment condition) has been satisfied, the adjustment unit 106 is instructed by the adjustment process control unit 304 to perform the density adjustment. In response to the instruction, under the control of the microcomputer 106A in the adjustment unit 106, the adjustment unit 106 detects the density of the multicolor toner image overlaid on the intermediate transfer member 28 with the detection sensor 106B as described in the first exemplary embodiment. Through the processes, the adjustment unit 106 can obtain the difference between the density in the image data and the density of the toner image formed based on the image data on the intermediate transfer member 28.

The adjustment unit 106 performs the density adjustment based on the obtained density difference. In response to the completion of the density adjustment, the adjustment unit 106 notifies the adjustment process control unit 304 via the engine control unit 305 that the density adjustment is completed. The adjustment process control unit 304 receives the notification of the completion of the density adjustment, and initializes the total number of printed sheets (set to zero), and the process proceeds to step S108.

Image Formation Process

With reference to FIG. 8, the image formation process according to the present exemplary embodiment is described. The processes not described in the description below are similar to those in the first exemplary embodiment, and consequently, the descriptions are omitted.

Similarly to the first exemplary embodiment, in the interpretation process of the PDL data 1000 in step S101, if the capacity of the RAM 101 for storing the intermediate data 2000 becomes insufficient, the PDL data processing unit 302 stops the input of the PDL data 1000. Further, the PDL data processing unit 302 notifies the job controller unit 306 that the intermediate data 2000 has not been stored. Through the processes, in step S106, the interpretation process of the PDL data 1000 is suspended.

In step S107A, in response to the reception of the notification, the job controller unit 306 notifies the PDL data processing unit 302 and the image generation unit 303 that the fallback process is to be started. Simultaneously with (in parallel with) the process, in step S107C, the adjustment process control unit 304 determines whether the second density adjustment condition has been satisfied. If the adjustment process control unit 304 determines that the second density adjustment condition has been satisfied, the adjustment process control unit 304 instructs (notifies) the adjustment unit 106 to perform the density adjustment process.

The adjustment unit 106 receives the instruction, and in step S107D, the adjustment unit 106 performs the density adjustment with the microcomputer 106A in the adjustment unit 106. In step S107E, the adjustment process control unit 304 receives the notification of the completion of the density adjustment with the adjustment unit 106, and the process proceeds to step S108. If the adjustment process control unit 304 determines that the second density adjustment condition has not been satisfied, the adjustment process control unit 304 does not instruct the adjustment unit 106 to perform the density adjustment process, and the process proceeds to step S108.

Advantages of the Present Exemplary Embodiment

In the exemplary embodiment, the printer 100 performs the above-described processes in the escape process (for example, in the fallback process).

Specifically, in the exemplary embodiment, the adjustment unit 106 provided in the electrophotographic engine 104 performs a part of the processes to be performed with the adjustment process control unit 304. As described above, in the exemplary embodiment, a part of the processes to be performed with the software is performed in the hardware different from the CPU 110. As a result, the load of the CPU 110 can be reduced.

The above-described configuration may be applied to the first exemplary embodiment. In the configuration, the condition (for example, the second density adjustment condition) other than the original condition for determining whether the adjustment process is to be performed is newly provided, and if the newly provided condition has been satisfied, in the escape process (for example, step S107A), the adjustment process (for example, step S107D) is performed in advance.

With the configuration, while the load of the CPU 110 is reduced, the simultaneous escape process and adjustment process under the specific conditions are performed. As a result, the speed decrease in the image formation occurred due to the adjustment process can be reduced.

The above-described configuration may be applied to the second exemplary embodiment. In the configuration, in the escape process, whether the image formation using the image formation bitmap data 3000 spooled in the HDD 102 can be continued is determined, and the adjustment process is performed in advance. With the configuration, while the load in the CPU 110 is reduced, the decrease in the image formation speed occurred due to the adjustment process can be further reduced.

A fourth exemplary embodiment will be described. In the above-described exemplary embodiments, as an example of the escape process, the fallback process is described. The escape process is, however, not limited to the fallback process, and the other escape processes may be similarly applied.

Figure 14:
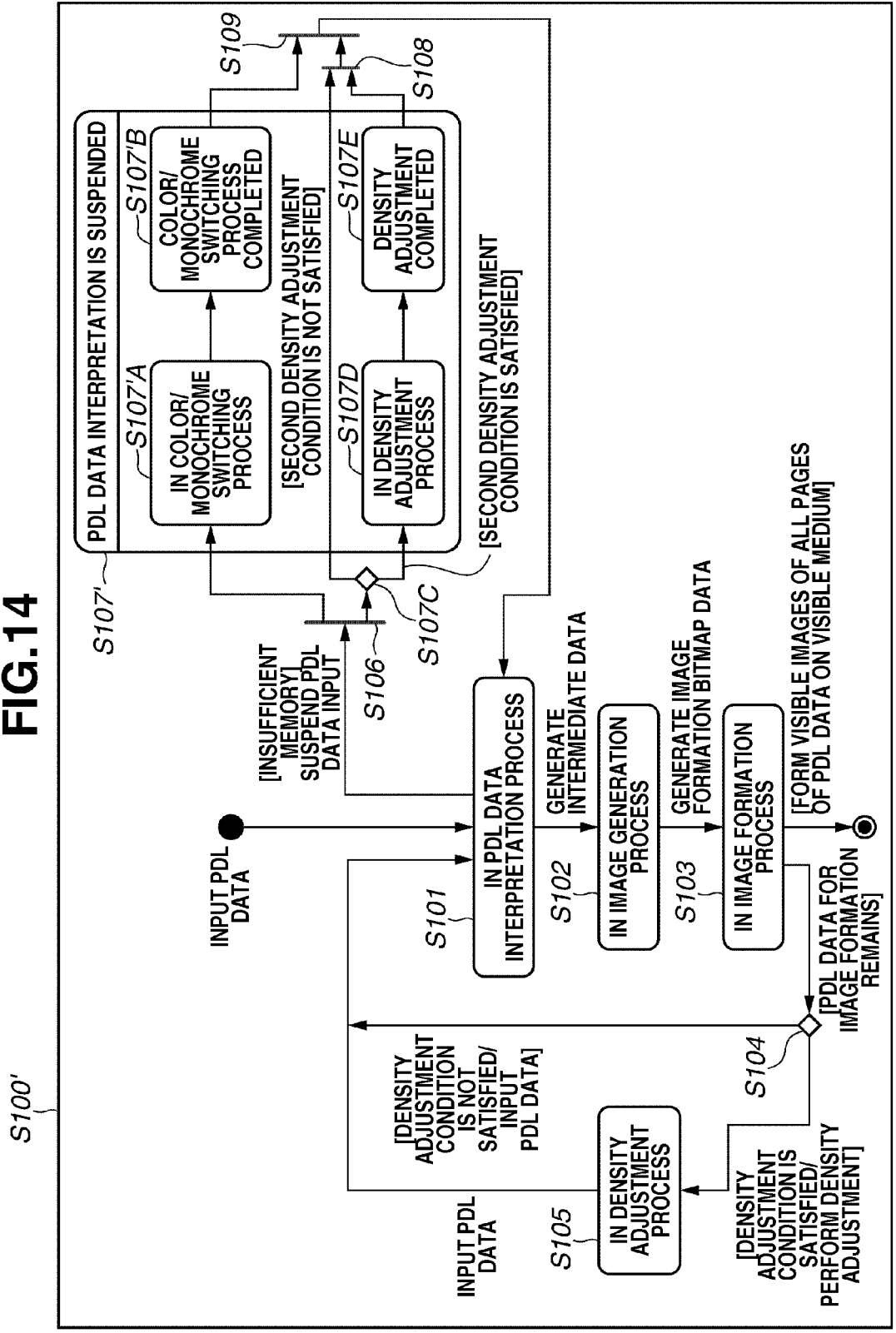
FIG. 14 illustrates an example of a flowchart in an image formation process.

For example, as illustrated in FIG. 14, the escape process may be a color/monochrome switching process performed in the electrophotographic engine 104. FIG. 14 illustrates a flowchart of the image formation process. In the present exemplary embodiment, it is assumed that in a case where the electrophotographic engine 104 forms a color image, or forms a monochrome image, in the color/monochrome switching process, the electrophotographic engine 104 is required to change the temperature in the fixing device 31. The temperature adjustment takes time, and consequently, similarly to the fallback process, an interval is included between the image formation processes.

In the exemplary embodiment, a configuration for performing the adjustment process in parallel with the color/monochrome switching process in step S107' is described. In the exemplary embodiment, descriptions of configurations similar to those in the first exemplary embodiment are omitted, and configurations different from those in the first exemplary embodiment are mainly described. With respect to the second exemplary embodiment, similarly, the descriptions are omitted.

In the interpretation process of the PDL data 1000 in step S101, the job controller unit 306 monitors the electrophotographic engine 104, and determines whether the color/monochrome switching process is performed. During the monitoring, if the job controller unit 306 determines that the color/monochrome switching process is started, the job controller unit 306 notifies the adjustment process control unit 304 that the color/monochrome switching process is started. In response to the notification, in step S107C, the adjustment process control unit 304 determines whether to perform the density adjustment process in parallel with the color/monochrome switching process based on the second density adjustment condition.

Advantages of the Present Exemplary Embodiment

In the exemplary embodiment, the adjustment process can be performed in parallel with the color/monochrome switching process in step S107'. As described above, the simultaneous color/monochrome switching process and adjustment process can reduce the speed decrease in the image formation occurred due to the adjustment process.

To the present exemplary embodiment, any one of the configurations according to the first exemplary embodiment to the third exemplary embodiment may be applied as needed. For example, in the exemplary embodiment, the condition (for example, the second density adjustment condition) other than the original condition for determining whether the adjustment process is to be performed is newly provided, and if the newly provided condition has been satisfied, in the fallback process, the adjustment process is performed in advance. As described above, the simultaneous fallback process and adjustment process under the specific condition can reduce the speed decrease in the image formation occurred due to the adjustment process.

Further, for example, in the present exemplary embodiment, the printer 100 determines whether the image formation bitmap data 3000 spooled in the HDD 102 exists. In the present exemplary embodiment, the decrease in the image formation speed occurred due to the adjustment process can be further reduced by determining whether the image formation using the image formation bitmap data 3000 spooled in the HDD 102 can be continued.

Further, for example, in the exemplary embodiment, the adjustment unit 106 provided in the electrophotographic engine 104 performs apart of the processes to be performed with the adjustment process control unit 304. According to the present exemplary embodiment, the load of the CPU 110 can be reduced.

A fifth exemplary embodiment will be described. In the above-described exemplary embodiments, as an example, the configuration for performing the second density adjustment determination process based on the limitation in processing the PDL data 1000 is described. Specifically, in the first and second exemplary embodiments, the fallback process is described as an example of the predetermined process causing the delay in the image processing being performed.

However, the second density adjustment determination process may be performed based on processes other than the fallback process causing delay in the generation of the image formation bitmap data 3000.

For example, the second density adjustment determination process may be performed in a case where a compression process (or decompression process) of the image formation bitmap data 3000 is to be performed. Further, for example, the second density adjustment determination process may be performed in a case where a data transfer rate of the PDL data 1000 decreased to a speed equal to or lower than a predetermined speed. Further, for example, the second density adjustment determination process may be performed depending on the type of the PDL data 1000.

A sixth exemplary embodiment will be described. In the above-described exemplary embodiments, as an example of the adjustment process, the density adjustment process is described. However, in place of the density adjustment process, an adjustment process capable of performing an adjustment by adjusting a test pattern formed on the intermediate transfer member 28 with the detection sensor 106B may be employed. For example, in place of the density adjustment process, a registration adjustment process for adjusting (positional adjustment) a deviation in printing of CMYK plates may be employed.

Alternatively, for example, in place of the density adjustment process, a temperature adjustment process for adjusting (temperature adjustment) the temperature of the fixing roller 32 may be employed.

The printer 100 is provided with a temperature sensor for detecting the surface temperature of the fixing roller 32, and a circuit for controlling ON/OFF of the heater depending on the temperature detected with the temperature sensor to adjust the amount of heat generation and control the surface temperature of the fixing roller 32 to become closer to an appropriate predetermined temperature. Consequently, in a case where the temperature adjustment process is employed, similarly to the information used in the second density adjustment determination process illustrated in FIG. 10, for example, information of predetermined temperatures (for example, 135° C. and 145° C.) for controlling ON/OFF and an adjustment tolerance (for example, 3° C.) are stored in the HDD 102.

In step S301, the adjustment process control unit 304 determines whether the current temperature of the fixing roller 32 is a temperature (for example, 137° C.<t<143° C.) calculated from the predetermined temperature and the adjustment tolerance. The predetermined temperature and the adjustment tolerance are the information (an example of the temperature information) that can specify the temperature for allowing the temperature adjustment.

In the adjustment (temperature adjustment) of the heat generation, the control using ON/OFF is described. The control is not limited to the ON/OFF control, alternatively, an appropriate control may be employed. For example, a control using an inverter may be employed. According to the configurations in the above-described exemplary embodiment, the delay in the image formation due to the adjustment can be further reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-018565 filed Jan. 31, 2012, which is hereby incorporated by reference herein in its entirety.

What is claimed is:

1. An image forming apparatus that forms an image based on image data generated by executing an image process, the image forming apparatus comprising:
at least one processor that operates to:
perform a recording process for recording the image formed based on the image data on a recording medium;
determine whether a predetermined process which causes a delay in the image process being executed is to be performed;
determine whether at least one condition for performing an adjustment process for maintaining an image formation has been satisfied based on condition information indicating the at least one condition; and
in a case where the at least one processor determines that the predetermined process is to be performed and the at least one processor determines that the at least one condition has been satisfied, instruct to perform the adjustment process, while the predetermined process is being executed,
wherein the at least one processor performs, as the adjustment process, a density adjustment for adjusting the density of the image to be recorded on the recording medium,
wherein, in a case where it is determined that the at least one condition has been satisfied, the at least one processor instructs to perform the density adjustment process,
wherein the predetermined process is at least one of a fallback process for escaping a limitation in a storage capacity in a storage area for storing the image data generated in the image process, a compression process for compressing the image data generated in the image process, and a decompression process for decompressing the image data generated in the image process, and wherein the predetermined process, which is at least one of the fallback process, the compression process and the decompression process, and the density adjustment process are executed in parallel.

2. The image forming apparatus according to claim 1, wherein the at least one processor further operates to:
record on the recording medium the image formed based on the image data; and
store image data, from the image date generated in the image process, of the image not yet recorded on the recording medium in the storage area, and
wherein, in the case where it is determined that the at least one condition has been satisfied and the image data is stored in the storage area, the at least one processor instructs to perform the density adjustment process.

3. The image forming apparatus according to claim 1, wherein, while the predetermined process, which is at least one of the fallback process, the compression process and the decompression process, and the density adjustment process are executed in parallel, at least one of following is suspended: data interpretation, data input, page description language ("PDL") data interpretation and PDL data input.

4. The image forming apparatus according to claim 3, wherein the suspension occurs when the storage capacity, in the storage area for storing the image data generated in the image process, becomes insufficient to perform the data input and/or input the PDL data input.

5. The image forming apparatus according to claim 1, wherein: (i) the at least one condition for performing the adjustment process comprises a first condition and a second condition; (ii) the predetermined process, which is at least one of the fallback process, the compression process and the decompression process, and the density adjustment process are executed in parallel when the first condition and the second condition are satisfied; and (iii) the predetermined process, which is at least one of the fallback process, the compression process and the decompression process, is executed and the density adjustment process is not executed when the first condition is satisfied but the second condition is not satisfied.

6. The image forming apparatus according to claim 5, wherein, after the predetermined process, which is at least one of the fallback process, the compression process and the decompression process, and the density adjustment process are executed in parallel when the first and second conditions are satisfied, or after the predetermined process, which is at least one of the fallback process, the compression process and the decompression process, only is executed when the first condition is satisfied but the second condition is not satisfied, at
least one of following is resumed: data interpretation, data input, PDL data interpretation and PDL data input.

7. The image forming apparatus according to claim 5, wherein the at least one processor further operates to perform a color/monochrome switching process.

8. A controlling method of an image forming apparatus that forms an image based on image data generated by executing an image process, the method comprising;
performing, by at least one processor of the image forming apparatus, a recording process for recording the image formed based on the image data on a recording medium;
determining, by the at least one processor, whether a predetermined process which causes a delay in the image process being executed is to be performed;
determining, by the at least one processor, whether at least one condition for performing an adjustment process for maintaining an image formation has been satisfied based on condition information indicating the at least one condition;
instructing, by the at least one processor, in a case where it is determined that the predetermined process is to be performed and the at least one condition has been satisfied, performing the adjustment process, while the predetermined process is being executed; and
performing, by the at least one processor, as the adjustment process, a density adjustment process for adjusting the density of the image to be recorded on the recording medium, in a case where it is determined that the at least one condition has been satisfied,
wherein the predetermined process is at least one of a fallback process for escaping a limitation in a storage capacity in a storage area for storing the image data generated in the image process, a compression process for compressing the image data generated in the image process, and a decompression process for decompressing the image data generated in the image process, and
wherein the predetermined process, which is at least one of the fallback process, the compression process and the decompression process, and the density adjustment process are executed in parallel.

9. The controlling method of the image forming apparatus according to claim 8, further comprising:
recording on the recording medium the image formed based on the image data, and
storing image data, from the image date generated in the image process, of the image not yet recorded on the recording medium in the storage area, and
wherein the performance of the adjustment process is instructed in the case where it is determined that the at least one condition has been satisfied and the image data is stored in the storage area.

10. The controlling method of the image forming apparatus according to claim 8, wherein, while the predetermined process, which is at least one of the fallback process, the compression process and the decompression process, and the density adjustment process are executed in parallel, at least one of following is suspended: data interpretation, data input, page description language ("PDL") data interpretation and PDL data input.

11. A non-transitory computer readable storage medium storing a program which causes at least one processor in an image forming apparatus to execute a controlling method, the method comprising:
determining whether a predetermined process which causes a delay in an image process being executed is to be performed;
determining whether at least one condition for performing an adjustment process for maintaining an image formation has been satisfied based on condition information indicating the at least one condition;
instructing, in a case where it is determined that the predetermined process is to be performed and the at least one condition has been satisfied, performing the adjustment process, while the predetermined process is being executed; and
performing as the adjustment process, a density adjustment process for adjusting the density of the image to be recorded on the recording medium, in the case where it is determined that the at least one condition has been satisfied, and wherein the predetermined process is at least one of a fallback process for escaping a limitation in a storage capacity in a storage area for storing the image data generated in the image process, a compression process for compressing the image data generated in the image process, and a decompression process for decompressing the image data generated in the image process, and wherein the predetermined process, which is at least one of the fallback process, the compression process and the decompression process, and the density adjustment process are executed in parallel.

12. The non-transitory computer readable storage medium according to claim 11, wherein, while the predetermined process, which is at least one of the fallback process, the compression process and the decompression process, and the density adjustment process are executed in parallel, at least one of following is suspended: data interpretation, data input, page description language ("PDL") data interpretation and PDL data input.

* * * * *